United States Patent
Castaneda Zuniga et al.

(10) Patent No.: US 10,975,186 B2
(45) Date of Patent: *Apr. 13, 2021

(54) PROCESS FOR PREPARING GRAFT COPOLYMER COMPRISING POLYETHYLENE

(71) Applicant: SABIC GLOBAL TECHNOLOGIES B.V., Bergen op Zoom (NL)

(72) Inventors: Diego Mauricio Castaneda Zuniga, Geleen (NL); Peter Neuteboom, Geleen (NL); Jan Nicolaas Eddy Duchateau, Geleen (NL); Markus Busch, Geleen (NL); Sebastian Bruno Fries, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 340 days.

This patent is subject to a terminal disclaimer.

(21) Appl. No.: 16/067,890

(22) PCT Filed: Jan. 2, 2017

(86) PCT No.: PCT/EP2017/050009
§ 371 (c)(1),
(2) Date: Jul. 3, 2018

(87) PCT Pub. No.: WO2017/153058
PCT Pub. Date: Sep. 14, 2017

(65) Prior Publication Data
US 2020/0332042 A1 Oct. 22, 2020

(30) Foreign Application Priority Data
Jan. 5, 2016 (EP) .................................... 16150205

(51) Int. Cl.
*C08F 255/02* (2006.01)
*C08F 8/30* (2006.01)
*C08F 210/02* (2006.01)
*C08F 238/00* (2006.01)

(52) U.S. Cl.
CPC ............ *C08F 255/026* (2013.01); *C08F 8/30* (2013.01); *C08F 210/02* (2013.01); *C08F 238/00* (2013.01)

(58) Field of Classification Search
CPC .............................. C08F 238/00; C08F 238/02
See application file for complete search history.

(56) References Cited

U.S. PATENT DOCUMENTS

| 3,857,821 A | 12/1974 | Becker et al. |
| 4,496,698 A | 1/1985 | Adriaans et al. |
| 10,822,447 B2 * | 11/2020 | Neuteboom .......... C08F 255/02 |
| 2010/0034862 A1 * | 2/2010 | Laronde ................ C08G 18/61 424/423 |
| 2012/0070644 A1 * | 3/2012 | Kang ..................... B01D 69/02 428/220 |
| 2016/0340297 A1 * | 11/2016 | Lemke ................. G01N 33/582 |
| 2017/0088888 A1 * | 3/2017 | El-Sagheer .......... C12Q 1/6853 |
| 2020/0262957 A1 | 8/2020 | Neuteboom et al. |

FOREIGN PATENT DOCUMENTS

| WO | 2006094723 A1 | 9/2006 |
| WO | 2010095049 A1 | 8/2010 |
| WO | 2017118616 A1 | 7/2017 |

OTHER PUBLICATIONS

Bergbreiter, et al, "Click-Based Covalent Layer-by-Layer Assembly on Polyethylene Using Water-Soluble Polymeric Reagents," Marcomolecules 2007, 40, 5337-5343 (Year: 2007).
Haochuan Chen et al, "A Facile Visible-Light-Induced Route to Functionalize Polymeric Substrates by Combining Controlled Radical Grafting Polymerization and Thiol-Yne Click Chemistry with Photoredox Catalyst Ir(ppy)3", Macromolecular Chemistry and Physics, vol. 215, 2014, pp. 1378-1387.
International Search Report for International Application No. PCT/EP2017/050009, International Filing Date Jan. 2, 2017, dated Apr. 10, 2017, 4 pages.
Peacock, Andrew J., "Handbook of Polyethylene", Chapter 3 Production Processes, 2000, Marcel Dekker, Inc., New York; ISBN 0824795466; p. 43-66.
Written Opinion for International Application No. PCT/EP2017/050009, International Filing Date Jan. 2, 2017, dated Apr. 10, 2017, 5 pages.

* cited by examiner

*Primary Examiner* — Jeffrey C Mullis
(74) *Attorney, Agent, or Firm* — Cantor Colburn LLN

(57) ABSTRACT

The invention relates to a process for preparing a graft copolymer comprising polyethylene, comprising the steps of: A) providing an ethylene copolymer comprising side chains having C≡C bond and B) reacting the ethylene copolymer of step A) with an azide at an elevated temperature in the absence of a catalyst to obtain the graft copolymer, wherein the azide compound is an azide compound having a functional group or a polymer having an azide group.

20 Claims, 2 Drawing Sheets

PROCESS FOR PREPARING GRAFT COPOLYMER COMPRISING POLYETHYLENE

CROSS REFERENCE TO RELATED APPLICATIONS

This application ins a National Stage application of PCT/EP2017/050009, filed Jan. 2, 2017, which claims the benefit of European Application No. 16150205.9, filed Jan. 5, 2016.

BACKGROUND

The invention relates to a process for preparing a graft copolymer comprising polyethylene. The invention further relates to such graft copolymer obtainable by the process.

There are many types of polyethylene made and sold today. One type of polyethylene is low density polyethylene (LDPE). It is possible to obtain LDPE with improved properties such as permeability, sealability, printability, processability, clarity and polarity by introducing different functional groups to the LDPE. These LDPEs have potential use in various applications such as barrier packaging, greenhouse, encapsulation, liquid packaging, bottles, food packaging, health care, pharmaceutical, agriculture, industrial packaging and solar devices.

Useful functionalities can be given to polyethylene homopolymer or copolymer by grafting functionalities to polyethylene or grafting a different type of polymer to polyethylene.

Known examples of functionalized ethylene copolymers include Ethylene Vinyl Acetate (EVA), Ethylene Vinyl Alcohol (EVOH), Cyclic Olefin Copolymer (COC) and MAH (Maleic AnHydride) grafted PE. A further advantageous copolymer is a tubular extrusion coating grade LDPE (such as the LDPE mentioned in WO2006/094723). Other examples include Ethylene (meth)acrylate copolymers such as Ethylene Methyl Acrylate, Ethylene Ethyl Acrylate, Ethylene Butyl Acrylate, Ethylene Methyl Methacrylate, Acid copolymers such as Ethylene Acrylic acid, Ethylene Methacrylic acid and their corresponding neutralized versions, known as Ionomers. Terpolymers or higher order polymers are also considered as functionalized polymers. These include ethylene/methyl acrylate/maleic anhydride, ethylene/butyl acrylate/glycidyl methacrylate, ethylene/butyl acrylate/carbon monoxide (EBACO), ethylene/vinyl acetate/carbon monoxide and ethylene/vinyl acetate/vinyl alcohol.

Known functionalized ethylene copolymers are made either by (1) copolymerization of ethylene and a monomer with the desired functionality in a reactor or (2) grafting of a monomer with the desired functionality onto the polyethylene backbone in e.g. an extruder.

For the preparation of different types of functionalized ethylene copolymers, the first method has a problem that it requires adjustment of the settings of the reactor for each comonomer or family of comonomers with different functionality. The adjustment of the settings of the reactor is time consuming, which leads to a less efficient process for the preparation of different types of functionalized ethylene copolymers. The method may be a high pressure free radical ethylene polymerization. In this case, the amount of the comonomers incorporated in the final copolymer may be limited depending on the type of the comonomer, due to the stability and/or conversion based on the typical conditions of the high pressure free radical ethylene polymerization.

The second method has a restriction that the amount of the functional groups to be grafted to the non-functionalized polyethylene is relatively low and less defined. Additionally extruder conditions (e.g. temperature, pressure), extruder design (e.g. single, twin extruder) and screw configuration can have a significant influence to the grafting process.

Grafting a different type of polymer to polyethylene has similar problems in the difficulty of its preparation method.

SUMMARY

It is an objective of the invention to provide a process in which above-mentioned and/or other problems are reduced.

Accordingly, the invention provides a process for preparing a graft copolymer comprising polyethylene, comprising the steps of:

A) providing an ethylene copolymer comprising side chains having C≡C bond and

B) reacting the ethylene copolymer of step A) with an azide or thiol compound at an elevated temperature in the absence of a catalyst to obtain the graft copolymer, wherein the azide or thiol compound is an azide or thiol compound having a functional group or a polymer having an azide or a thiol group.

Accordingly, the invention provides a process for preparing a graft copolymer comprising polyethylene, comprising the steps of:

A) providing an ethylene copolymer comprising side chains having C≡C bond and

B) reacting the ethylene copolymer of step A) with an azide compound at an elevated temperature in the absence of a catalyst to obtain the graft copolymer, wherein the azide compound is an azide compound having a functional group or a polymer having an azide group.

DETAILED DESCRIPTION

Figure 1:
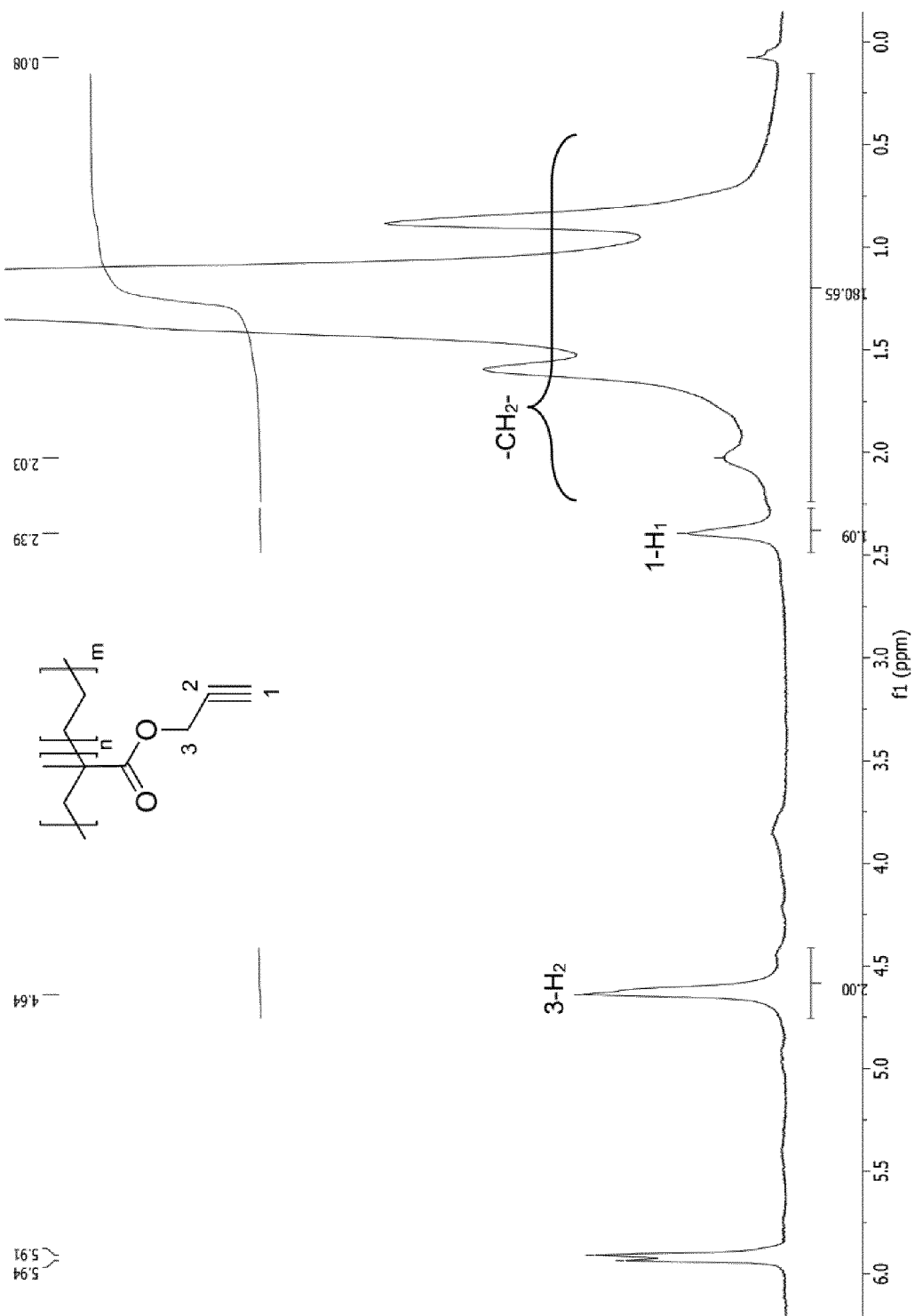
FIG. 1 shows the HT-$^1$H-NMR results of a copolymer of ethylene and propargyl methacrylate (PMA)

According to the process of the present invention, an intermediate ethylene copolymer, i.e. the ethylene copolymer comprising side chains having C≡C bond, is provided and subsequently a desired functionality or polymer is added to the side chains.

When the azide or thiol compound is an azide or thiol compound having a functional group, the C≡C bond of the ethylene copolymer of step A) reacts with the azide or thiol group and a functionalized grafted ethylene copolymer is obtained. Advantageously, a functionalized grafted ethylene copolymer with a desired functionality can be obtained by selecting an azide or thiol compound with a suitable functional group.

When the azide or thiol compound is a polymer having an azide or a thiol group, the C≡C bond of the ethylene copolymer of step A) reacts with the azide or the thiol group and a graft copolymer of the ethylene copolymer of step A) and the polymer comprising the azide or the thiol group is obtained. Advantageously, the graft copolymer obtained by step B) has the combined properties of the two polymers constituting the graft copolymer. Due to the covalent bonding of the two polymers, there is less chance of phase separation compared to a blend of both polymers.

The reaction of the the ethylene copolymer comprising side chains having C≡C bond and the azide or thiol compound is performed without the use of a catalyst, free radical initiator or photo initiator. This leads to an advantage that the process is simple and the final graft copolymer has no catalyst residue from step B).

The process of the present invention does not require changes in the reactor settings for preparing ethylene copolymers with different functionalities. One intermediate ethylene copolymer can advantageously be used for preparing ethylene copolymers with different functionality. For preparing ethylene copolymers with different functionalities, the type of the azide/thiol compound to be reacted with the intermediate ethylene copolymer is essentially the only thing which needs to be changed. Further, unlike the prior art technology in which polyethylene is grafted with a monomer with a desired functionality, the intermediate ethylene copolymer used in the present invention possess a reactive group (CEC bond) which can be used for further reaction with desired azide/thiol compound just by heat. There is hence less limitation to the amount of the desired functional groups or polymers which can be included in the final graft copolymer and a better control of incorporation is met. Accordingly, various types of graft copolymers with desired degree of grafting can be obtained with tuned properties in an efficient manner.

Step A)

In step A), an ethylene copolymer comprising side chains having C≡C bond is provided. This intermediate ethylene copolymer serves as the backbone of the graft copolymer comprising polyethylene obtained by the process of the invention and its side chains serve as the points to which the desired functional group or polymer is attached.

The ethylene copolymer provided in step A) preferably has a number-average molecular weight $M_n$ of at least 5.0 kg/mol and/or a weight average molecular weight $M_w$ of at least 50 kg/mol. However, the ethylene copolymer provided in step A) may also be oligomers, waxes and polymers having a molecular weight $M_n$ of less than 5.0 kg/mol or a molecular weight $M_w$ of less than 50 kg/mol. $M_n$ and $M_w$ can e.g. be determined by gel permeation chromatography (GPC). The gel permeation chromatography may be performed according to the method described in the experimental section.

Preferably, the ethylene copolymer provided in step A) has a density of 900 to 1100 kg/m³, for example 905 to 1000 kg/m³, 910 to 990 kg/m³, 915 to 970 kg/m³, 918 to 960 kg/m³ or 920 to 950 kg/m³, according to ISO1183.

Preferably, the ethylene copolymer provided in step A) a melt flow rate of 0.10 g/10 min to 150 g/10 min according to ASTMD1238 measured at 190° C. and 2.16 kg. Preferably, the ethylene copolymer according to the present invention has a melt flow rate of 10 to 900 g/10 min according to ASTMD1238 measured at 125° C. and 0.325 kg.

The ethylene copolymer comprising side chains having C≡C bond may be provided by copolymerization of ethylene and a comonomer having a C≡C bond or by grafting a compound having a C≡C bond to a non-functionalized polyethylene backbone.

Copolymerization of Ethylene and Comonomer

Preferably, step A) involves copolymerization of ethylene and a comonomer having a C≡C bond. This method advantageously provides a possibility for a relatively high amount of the side chains having C≡C bond to be included in the ethylene copolymer. More preferably, step A) involves preparing the ethylene copolymer in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula

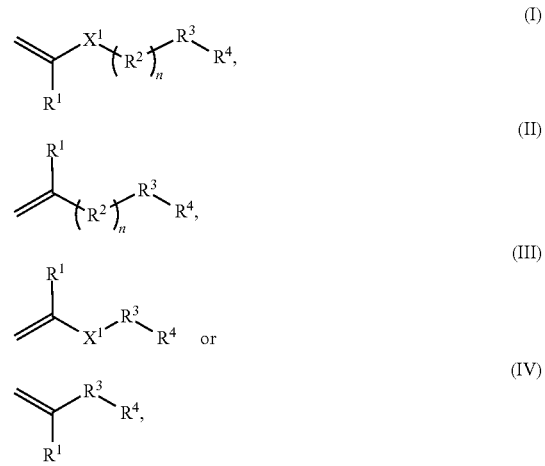

wherein
$R^1$ is hydrogen or methyl;
$X^1$ is —CO—O— or —CO—NH—;
$R^2$ is —CH$_2$—O—, —O—CO—, —Si(CH$_3$)$_2$—, —Si(CH$_3$)$_2$—O— or —CR$^5$R$^6$— wherein $R^5$ and $R^6$ are independently selected from hydrogen, methyl, ethyl and hydroxyl;
n is an integer from 1 to 32 and $R^2$ is same or different from each other when n is 2 to 32; and
$R^3$ is —C≡C— and $R^4$ is hydrogen, $C_1$-$C_{10}$ linear or branched alkyl, $C_1$-$C_{10}$ linear or branched hydroxyalkyl or phenyl
or
the unit $R^3$-$R^4$ stands for

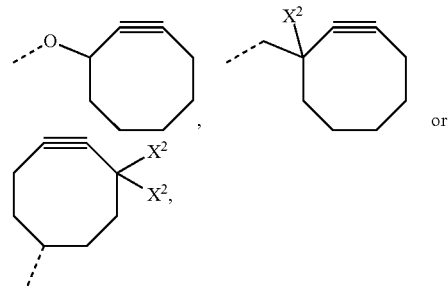

wherein $X^2$ is F, Cl, Br or I.

The ethylene copolymer obtained by step A) comprises a C≡C bond.

The C═C bond of the compounds (I)-(IV), together with ethylene, react with generated radicals and incorporate the compounds (I)-(IV) in the growing polymer chain. It was surprisingly found that C≡C bonds present in compounds (I)-(IV) do not react with generated radicals and are maintained in the copolymer obtained as branches of the main chain. No crosslinking originating from the C≡C bond was observed. It was therefore surprisingly found that an ethylene copolymer having branches comprising C≡C bonds can be made. It is known that trace amounts of acetylene during the high pressure polymerization of ethylene leads to an uncontrollable reaction (runaway reaction) which produces excessive heat and hence copolymerization involving ethylene and compounds with C≡C bonds was considered to be extremely difficult. For example, Zhang et. al., Runaway Phenomena in Low-Density Polyethylene Autoclave Reactors, AIChE Journal, October 1996 Vol. 42, No. 10, mentions on p. 2920 that small amounts of impurities (e.g., acetylene) can be found in the reactor feed and they can decompose into free radicals and induce runaway reactions. The present inventors have surprisingly found that the compounds (I)-(IV) do not cause runaway reactions like acetylene under high pressure conditions. The compounds (I)-(IV) do not undergo a thermal decomposition during the copolymerization and the C≡C bond is maintained in the final ethylene copolymer.

As the comonomer having a C≡C bond, the compounds (I)-(IV) may be used individually or in combination with each other in the process of the invention.

Preferably, only one type of the comonomer having a C≡C bond is used in the process of the invention for easy control of the process conditions. Preferably, the comonomer having a C≡C bond is compound (I) or (III).

Examples of preferred embodiments of compounds (I)-(IV) are mentioned below.

For compound (I):
Preferably, $X^1$ is —CO—O—.
Preferably, $R^2$ is —CH$_2$—.
Preferably, n is from 1 to 22, more preferably from 1 to 12, even more preferably from 1 to 5, even more preferably 1.
Preferably, $R^3$ is —C≡C— and $R^4$ is methyl or hydrogen, most preferably hydrogen; or
$R^3$-$R^4$ stands for

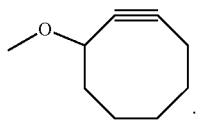

Particularly preferred embodiments of compound (I) include:
propargyl acrylate ($R^1$=hydrogen, $X^1$=—CO—O—, $R^2$=—CH$_2$—, n=1, $R^3$=—C≡C— and $R^4$=hydrogen),
propargyl methacrylate ($R^1$=methyl, $X^1$=—CO—O—, $R^2$=—CH$_2$—, n=1, $R^3$=—C≡C— and $R^4$=hydrogen) and
2-methyl-acrylic acid 3-(cyclooct-2-ynyloxy)-propyl ester ($R^1$=methyl, $X^1$=—CO—O—, $R^2$=—CH$_2$—, n=3 and $R^3$-$R^4$=

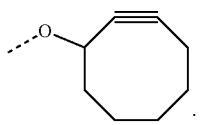

For compound (II):
Preferably, $R^2$ is —CH$_2$—, —CH$_2$—O— and/or —O—CO—.
Preferably, n is from 1 to 22, more preferably from 1 to 12 even more preferably from 1 to 5 even more preferably 1 or 2. In some preferred embodiments where n is 2, $R^2_2$ is represented by —CH$_2$—O—CH$_2$— or —CH$_2$—O—CO—.

Preferably, $R^3$ is —C≡C— and $R^4$ is hydrogen, $C_1$ hydroxyalkyl, $C_2$ hydroxyalkyl, $C_3$ branched hydroxyalkyl, phenyl or $C_6$ linear alkyl.

Particularly preferred embodiments of compound (II) include:
6-hepten-3-yn-1-ol ($R^1$=hydrogen, $R^2$=—CH$_2$—, n=1, $R^3$=—C≡C— and $R^4$=$C_2$ hydroxyalkyl),
3-methyl-1-penten-4-yn-3-ol ($R^1$=hydrogen, $R^2$=—CR$^5$R$^6$ wherein $R^5$=OH and $R^6$=CH$_3$, n=1, $R^3$=—C≡C— and $R^4$=hydrogen),
2-methyl-6-hepten-3-yn-2-ol ($R^1$=hydrogen, $R^2$=—CH$_2$—, n=1, $R^3$=—C≡C— and $R^4$=—C(CH$_3$)$_2$OH),
1-phenyl-4-penten-1-yne ($R^1$=hydrogen, $R^2$=—CH$_2$—, n=1, $R^3$=—C≡C— and $R^4$=phenyl),
5-hexen-2-yn-1-ol ($R^1$=hydrogen, $R^2$=—CH$_2$—, n=1, $R^3$=—C≡C— and $R^4$=$C_1$ hydroxyalkyl),
3-(allyloxy)-1-propyne ($R^1$=hydrogen, $R^2$=—CH$_2$—O— and —CH$_2$—, n=2, $R^3$=—C≡C— and $R^4$=hydrogen),
allyl propiolate ($R^1$=hydrogen, $R^2$=—CH$_2$— and —O—CO—, n=2, $R^3$=—C≡C— and $R^4$=hydrogen) and
2-Nonynoic acid, 2-propen-1-yl ester ($R^1$=hydrogen, $R^2$=—CH$_2$— and —O—CO—, n=2, $R^3$=—C≡C— and $R^4$=$C_6$ linear alkyl).

For compound (III):
Preferably, $X^1$ is —CO—O—.
Preferably, $R^3$ is —C≡C— and $R^4$ is methyl or hydrogen, most preferably hydrogen.

For compound (IV):
Preferably, $R^3$ is —C≡C— and $R^4$ is hydrogen, methyl or ethyl.

Particularly preferred embodiments of compound (IV) include:
2-methyl-1-hexen-3-yne ($R^1$=methyl, $R^3$=—C≡C— and $R^4$=ethyl) and
2-methyl-1-buten-3-yne ($R^1$=methyl, $R^3$=—C≡C— and $R^4$=hydrogen).

The copolymerization of step A) of the process of the invention is preferably carried out at pressures of from 150 MPa to 350 MPa. The pressures may preferably be 160 MPa to 300 MPa or more preferably 160 MPa to 280 MPa. The temperatures are in the range from 100° C. to 350° C., preferably from 120° C. to 340° C. and more preferably from 150° C. to 320° C.

It is important that the compound (I)-(IV) does not undergo decomposition during the copolymerization. The temperature and pressure should be chosen to ensure that decomposition does not occur. High pressure Differential Thermal Analysis (DTA) analysis may be carried out on compound (I)-(IV) for determining its thermal stability to choose the temperature and pressure for the copolymerization.

In particularly preferred embodiments, the comonomer having a C≡C bond is propargyl methacrylate or propargyl acrylate and the process of the invention is carried out at 150° C. to 210° C., preferably at 160 MPa to 250 MPa.

Preferably, the total amount of the comonomer having a C≡C bond is 0.1-10 mol % of the total weight of ethylene and all comonomers, more preferably 0.15-8 mol %, 0.2-6 mol %, 0.2-3 mol % or 0.2-1 mol %, of the total weight of ethylene and all comonomers.

The copolymerization of step A) of the process of the present invention is not only suitable for the copolymerization of ethylene and the compounds (I)-(IV) but also for the copolymerization of ethylene, the compounds (I)-(IV) and one or more further comonomers which are free-radically copolymerizable with ethylene under high pressure. Examples of suitable further comonomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, particularly preferably vinyl acetate, can be used as comonomers. n-butyl acrylate, acrylic acid or methacrylic acid are particularly advantageously used as comonomer. In the case of a copolymerization of ethylene, the compounds (I)-(IV) and further comonomers, the proportion of the further comonomer or the further comonomers in the reaction mixture is from 1 to 45% by weight, preferably from 3 to 30% by weight, based on the amount of all monomers, i.e. the sum of ethylene and all comonomers. Depending on the type of the further comonomer, it can be preferred to feed the further comonomers at a plurality of different points to the reactor.

The reaction can be optimally controlled by metering different initiators or mixtures of initiators at different initiator injection points. Possible initiators for starting the free-radical polymerization are, for example, air, oxygen, azo compounds or peroxidic polymerization initiators. Initiation using organic peroxides or azo compounds represents a particularly preferred embodiment of the process of the invention.

Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoyl-peroxy) hexane, tert-amyl peroxy-2-ethylhexanoate, dibenzoyl peroxide, tert-butyl peroxy-2 ethyl-hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxy-neodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxy benzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators.

In general the concentration of added initiator is less than 200 ppm. Thus, the resulting resins are not greatly contaminated by initiator residues and normally require no purification prior to use. Certain initiator residues can impart an off taste or smell to resins, making them undesirable in food packaging applications. In some embodiments of the present invention, the free-radical polymerization initiator, which is fed to a reaction zone, is a single type of azo compound or organic peroxide. In other embodiments of the present invention, the free-radical polymerization initiator, which is fed to a reaction zone, is a mixture of at least two different azo compounds or organic peroxides. If such initiator mixtures are used these may be fed to all reaction zones. Alternatively, some reaction zones (e.g. first two zones) may be fed with initiator mixes and other reaction zones (e.g. last two zones) may be fed with a single type of initiator. There is no limit for the number of different initiators in such a mixture, however the mixtures may be composed of from two to six and in particular of four or five different initiators. Particular preference is given to using mixtures of initiators which have different decomposition temperatures.

Additionally, peroxide is typically added together with a peroxide solvent which typically comprises $C_2$-$C_{20}$ normal or iso-paraffin. The solutions comprise the initiators or initiator mixtures in proportions of from 2 to 65% by weight, preferably from 5 to 40% by weight and particularly preferably from 10 to 30% by weight.

The copolymerization of step A) of the process of the present invention can be carried out with all types of tubular reactors suitable to high-pressure polymerization. Such reactors can have one or more reaction zones and have preferably from 2 to 6 reaction zones and particularly preferably from 3 to 5 reaction zones. The number of reaction zones is given by the number of injection points for the initiator. That means, in each reaction zone, polymerization is initiated by addition of initiators which decompose into free radicals. Usually each reaction zone is followed by a zone of the tubular reactor in which cooling of the reaction mixture occurs. Preferred tubular reactors have a length-to-diameter ratio of greater than 1000, preferably from 10000 to 40000 and especially from 25000 to 35000. Residence time may generally be between 60 to 300 s.

Preferably the comonomer having a C≡C bond is first mixed with ethylene before it is brought into contact with the free-radical polymerization initiator. Such a mixture of ethylene and the comonomer having a C≡C bond can be fed only to the inlet of the tubular reactor. It is also possible to feed more than one stream of ethylene and the comonomer having a C≡C bond and feed accordingly one or more of these streams as side stream to the tubular reactor.

The copolymerization of step A) of the process of the present invention can also be carried out with all types of autoclave reactor. Such reactors generally have height to diameter ratios from 1 up to 20. Residence time may generally be between 8 up to 120 s. Autoclave reactors, based on its temperature profile are classified in monozone or multizone reactors, controlled by the number of initiator injection points and/or by the presence of for example baffles in the reactor.

The copolymerization of step A) of the process of the present invention can be carried out in a single tubular reactor or a single autoclave reactor. Step A) of the process of the present invention can also be carried out in 2 or more tubular reactors connected in series, 2 or more autoclave reactors connected in series or an autoclave reactor and a tubular reactor connected in series. Such a process for producing polymers or copolymers of ethylene using an autoclave reactor and a tubular reactor connected in series is known e.g. from U.S. Pat. No. 4,496,698.

During the polymerisation it is possible to add for example inhibitors, scavengers and/or a chain regulator (chain transfer agent). Suitable chain regulators include an aldehyde for example propionaldehyde, a ketone for example acetone or an aliphatic hydrocarbon for example propane and propene. Chain transfer is the process by which the growth of a polyethylene chain is terminated in such a way that the free radical associated with it transfers to another molecule on which further chain growth occurs, i.e., the number of free radicals and growing chains remains constant. The molecule to which the free radical is transferred can be either ethylene or a deliberately added chain transfer agent (CTA) such as a solvent molecule. The net effect of adding a chain transfer agent is to reduce the average molecular weight of the resin.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, hydrogen and phosphine.

Preferably, the copolymerization is performed in the presence of a chain transfer agent selected from the group consisting of propionaldehyde, n-heptane, propylene, propane, isopropanol and acetone.

Grafting to Polyethylene Backbone

In other embodiments, step A) involves grafting a compound having a C≡C bond to a base ethylene polymer which is an ethylene homopolymer or a copolymer of ethylene and α-olefins with 3-12 C atoms.

The base ethylene polymer is an ethylene homopolymer or a copolymer of ethylene and α-olefins with 3-12 C atoms includes LLDPE, LDPE and HDPE. α-olefin comonomers include 1-butene, 1-hexene, 4-methyl pentene and 1-octene. Preferably, the alpha-olefin co monomer is present in an amount of about 5 to about 20 percent by weight of the ethylene-alpha olefin copolymer, for example in an amount of from about 7 to about 15 percent by weight of the ethylene-alpha olefin copolymer.

The production processes of low density polyethylene (LDPE), high density polyethylene (HDPE) and linear low density polyethylene (LLDPE) are summarized in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

With linear low density polyethylene (LLDPE) as used herein is meant a low density polyethylene copolymer comprising ethylene and a $C_3$-$C_{10}$ alpha-olefin co monomer (ethylene-alpha olefin copolymer) having a density from 915 to 934 kg/m$^3$. More preferably, the density of the linear low density polyethylene is from 917 to 920 kg/m$^3$.

Preferably, the density of the low density polyethylene (LDPE) ranges from 915 to 935, for example from 920 to 928 kg/m$^3$.

Preferably, the density of the high density polyethylene (HDPE) ranges from 940 to 965 kg/m$^3$.

Suitable examples of the compound having a C≡C bond to be grafted are the same as the comonomers (I)-(IV) described above.

The grafting of the compound having a C≡C bond to the base ethylene polymer may be done according to known methods. Known methods include reactions in solution, in a molten state or in a solid state, in combination with one or more radical initiator.

The reactions in solution may involve dissolving the base ethylene polymer in a solvent such as toluene, xylene at reflux temperature. After addition of the compound having a C≡C bond and the radical initiator(s) to the solution of the base ethylene polymer, the grafting reaction will take place for a certain amount of time, depending on the decomposition kinetics of the radical initiator at reaction temperature.

The reactions in a molten state may involve melting the base ethylene polymer in an extruder. After addition of the compound having a C≡C bond and the radical initiator(s), the grafting reaction can take place. Compressed fluids such as supercritical fluids, such as supercritical $CO_2$, may be added to the molten base ethylene polymer. Compressed fluids such as supercritical fluids have a function of plasticizing the system for improving mass transport for the reactants and decreasing system viscosity. The compressed fluids may be added separately from the compound having a CEC bond. Alternatively, the compound having a C≡C bond may be dissolved in the compressed fluids for addition to the molten base ethylene polymer. Grafting efficiency is determined by the interplay between parameters such as decomposition kinetics of the radical initiator, temperature, residence time and screw design.

The reactions in a solid state may involve dissolving the compound having a C≡C bond in compressed fluids such as supercritical fluid, such as supercritical $CO_2$, and adding the compressed fluids in which the compound having a C≡C bond is dissolved to the base ethylene polymer at temperatures below the melting point of the base ethylene polymer. The compounds having a C≡C bond can be grafted onto the base ethylene polymer by introducing one or more radical initiator(s) in the compressed fluids. Electromagnetic radiation or electron beam may also be used.

The term 'supercritical fluid' is well-known and is meant a highly compressible substance in a supercritical state. The term 'supercritical fluid' is herein used interchangeably with 'the substance which forms supercritical fluid'. The supercritical fluid may be a supercritical fluid of substances such as halogenated hydrocarbons, aliphatic hydrocarbons, cyclic hydrocarbons, aromatic hydrocarbons, esters, ethers. The supercritical fluid may a supercritical fluid of substances selected from the group consisting of $CO_2$, $NH_3$, $H_2O$, $N_2O$, $CH_4$, ethane, propane, propylene, n-butane, butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and $SF_6$ and combinations thereof.

Step B)

The ethylene copolymer having C≡C bond is reacted with an azide or thiol compound at an elevated temperature in the absence of a catalyst.

The azide or thiol compound may be a compound having at one end an azide or thiol group which reacts with the C≡C bond of the ethylene copolymer and at another end the functional group which will determine the properties of final functional ethylene copolymer. Alternatively, the azide or thiol compound is a polymer having an azide or a thiol group. The ethylene copolymer having C≡C bond and the polymer having an azide or a thiol group will react and will be covalently linked. Hence there is a less chance of phase separation and thus properties of resulting graft copolymer comprising polyethylene will be a combination of both polymers.

When the azide or thiol compound is a polymer having an azide or a thiol group, the azide or thiol compound preferably has $M_n$ of at least 2000 g/mol.

The reaction of the azide group and the C≡C bond undergoes a thermal Huisgen 1,3-dipolar cycloaddition, also called thermal copper free "click" reaction, to form regioisomeric mixtures of 1,2,3-triazoles:

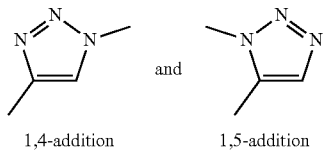

1,4-addition     1,5-addition

The "click" reaction is described in detail e.g. in WO2010/095049 and J. Baskin et. al., *Click Chemistry for Biotechnology and Material Science*, chapter 3, 2009; R. Balazset. al, *Chem. Eur.*, vol. 18, p. 822-828, 2012; C. Remzi Becer, et. al, *Angew. Chem. Int. Ed.*, vol. 48, p. 4900-4908, 2009; H. Li et. al, *Polym. Chem.*, vol. 3, p. 1075-1083, 2012; G. de Almeida et. al, *Angew. Chem. Int. Ed.*, vol. 51, p. 2443-2447, 2012; C. Gordon et. al, *J. Am. Chem. Soc.*, vol. 134, p. 9199-9208, 2012 and P. Cardillo et. al, *New J. Chem.*, vol. 32, p. 47-53, 2008.

Preferably, the azide compound is represented by:

$N_3$-spacer[1]-FG[1]     (I)

wherein

FG[1] is selected from the group consisting of —OH, —OR[5], —NH$_2$, —NHR, —NR[5]$_2$, —SH, —CH=CH$_2$,

—COOH·-SO$_3$H, —NH—COR[5], —N$_3$, —Si(OR[5])$_3$,

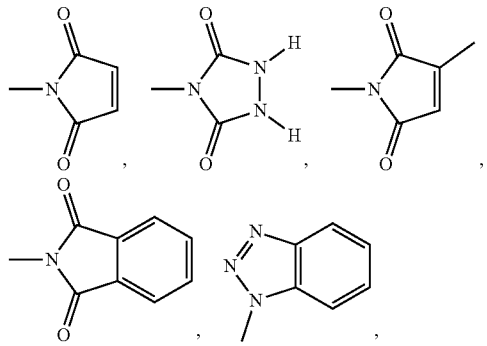

—I, —Br, —Cl, —F, —COOR[5], —COR[5], —CN, -phenyl, —C$_6$H$_4$R[5], —S—C$_6$H$_5$ and —CO—C$_6$H$_5$, where R[5] is a C$_1$-C$_{10}$ linear or branched alkyl, spacer[1] is selected from the group consisting of —(CH$_2$)$_p$—, —(CH$_2$)$_p$—C$_6$H$_4$—, —C$_6$H$_4$—(CH$_2$)$_p$—, —(CHR[6])$_p$—, —(CR[6]$_2$)$_p$—, —(O—CH$_2$—CH$_2$)$_p$—, —(O—CH$_2$—CHCH$_3$)$_p$—, —SO$_2$—, —SO$_2$—C$_6$H$_4$—, —SO$_2$—C$_6$H$_2$R[6]$_2$—, —C$_6$H$_2$R[6]$_2$—, where p is an integer from 1 to 20 and where R[6] is C$_1$-C$_{10}$ a linear or branched alkyl.

Preferably, p is an integer from 1 to 15.

Particularly preferred examples of the azide compound having a functional group include 4-(4-(2-Azidoethoxy)phenyl)-1,2,4-triazolidine-3,5-dione and azidomethyl phenyl sulfide.

The azide compound may be a polymer having an azide group, i.e. a polymer onto which an azide group is covalently bonded.

Particularly preferred examples of the polymer having an azide include azide terminated poly(methyl acrylate), azide terminated polystyrene and azide terminated poly(L-lactide).

The thiol compound may be a thiol compound having a functional group. In this case, the thiol compound is preferably represented by:

HS-spacer[2]-FG[2]     (II)

wherein

FG[2] is selected from the group consisting of —OH, —CHOH—CH$_2$OH, —OR[7], —NH$_2$, —NHR[7], —NR[7]$_2$, —SH, —CH=CH$_2$,

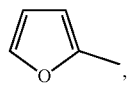

—COOH, —N$_3$, —Si(OR[7])$_3$,

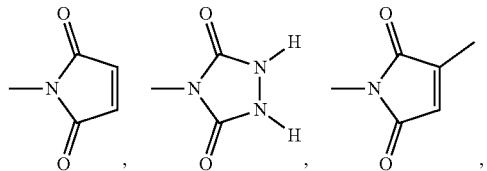

-continued

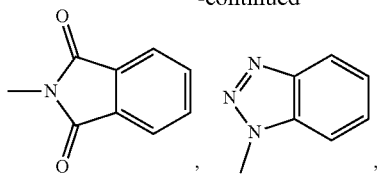

—I, —Br, —Cl, —F, —COOR$^7$, —COR$^7$, —CN, -phenyl, —C$_6$H$_4$R$^7$, —C$_6$H$_4$NH$_2$, —C$_6$H$_4$OH, —C$_6$H$_4$OR$^7$, —C$_6$H$_4$Cl, where R$^7$ is a C$_1$-C$_{10}$ linear or branched alkyl, spacer$^2$ is selected from the group consisting of —(CH$_2$)$_q$—, —(CH$_2$)$_q$—C$_6$H$_4$—, —C$_6$H$_4$—(CH$_2$)$_q$—, —(CHR$^8$)$_q$—, —(CR$^8$$_2$)$_q$—, —C$_6$H$_4$—, —C$_6$H$_2$R$^8$$_2$— and a heterocyclic hydrocarbon group comprising N, O and/or S atom, where q is an integer from 1 to 20 and where R$^8$ is a C$_1$-C$_{10}$ linear or branched alkyl.

Preferably, q is an integer from 1 to 15.

The heterocyclic hydrocarbon group comprising N, O and/or S atom include e.g.

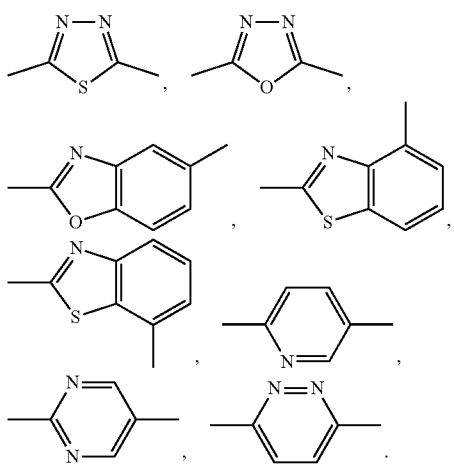

Particularly preferred examples of the thiol compound having a functional group include 2-mercaptoethanol, methyl thioglycolate, 4-aminothiophenol and 1-thioglycerol.

The thiol compound may be a polymer having a thiol group, i.e. a polymer onto which a thiol group is covalently bonded.

Particularly preferred examples of the polymer having thiol include poly(ethylene glycol) methyl ether thiol.

In step B), the amount of azide or thiol compound may be selected depending on the desired degree of modification. The amount of azide or thiol compound may be in molar excess of the amount of side chains having C≡C bond of the ethylene copolymer of step A). The amount of azide or thiol compound may be equimolar to the amount of side chains having C≡C bond of the ethylene copolymer of step A). The amount of side chains having C≡C bond of the ethylene copolymer of step A) may be in molar excess of the amount of azide or thiol compound.

Step B) is performed under conditions suitable for reacting the C≡C bond with an azide or a thiol group at an elevated temperature in the absence of a catalyst. Step B) may be performed in solution, in a molten state or in a solid state.

The reactions in solution may involve dissolving the ethylene copolymer having CEC bond in e.g. C$_2$H$_2$Cl$_4$, toluene, xylene, compressed ethylene (such as supercritical ethylene) or compressed ethane (such as supercritical ethane) at an elevated temperature. After addition of the azide/thiol compound to the solution, the reaction between the C≡C bond and the azide or the thiol group will take place for a certain amount of time, depending on the reaction conditions and stability of the chosen azide/thiol compound. When step B) is performed in solution, the elevated temperature may e.g. be 100 to 300° C.

The reactions in a molten state may involve melting the ethylene copolymer having C≡C bond e.g. in an extruder. After addition of the azide/thiol compound, the reaction between the C≡C bond and the azide or the thiol group can take place. Compressed fluids such as supercritical fluids, such as supercritical CO$_2$, may be added to the molten ethylene copolymer having C≡C bond. Compressed fluids have a function of plasticizing the system for improving mass transport for the reactants and decreasing system viscosity. The compressed fluids may be added separately from the azide/thiol compound. Alternatively, the azide/thiol compound may be dissolved in the compressed fluids for addition to the molten ethylene copolymer having C≡C bond. Reaction efficiency is determined by the interplay between parameters such as temperature, residence time, screw design and stability of the chosen azide/thiol compound. When step B) is performed in a molten state, the elevated temperature can be chosen within temperatures at which the ethylene copolymer having C≡C bond is in a molten state and which is below the dissociation temperature of the azide/thiol compound. For example, the elevated temperature may be a temperature between the melting point of the ethylene copolymer having C≡C bond and 300° C.

The reactions in a solid state may involve dissolving the azide/thiol compound in compressed fluids such as supercritical fluid, such as supercritical CO$_2$, and adding the compressed fluids in which the azide/thiol compound is dissolved to the ethylene copolymer having C≡C bond at temperatures below the melting point of the ethylene copolymer having C≡C bond. When step B) is performed in a solid state, the elevated temperature may e.g. be from 80 to the melting point of the ethylene copolymer having C≡C bond.

The term 'supercritical fluid' is well-known and is meant a highly compressible substance in a supercritical state. The term 'supercritical fluid' is herein used interchangeably with 'the substance which forms supercritical fluid'. The supercritical fluid may be a supercritical fluid of substances such as halogenated hydrocarbons, aliphatic hydrocarbons, cyclic hydrocarbons, aromatic hydrocarbons, esters, ethers. The supercritical fluid may a supercritical fluid of substances selected from the group consisting of CO$_2$, NH$_3$, H$_2$O, N$_2$O, CH$_4$, ethane, propane, propylene, n-butane, butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and SF$_6$ and combinations thereof.

Step B) is preferably performed at an elevated temperature in molten state of the ethylene copolymer having C≡C bond, e.g. in an extruder. In some preferred embodiments, step B) involves melting the ethylene copolymer having C≡C bond e.g. in an extruder and adding the azide or thiol compound and a compressed fluid such as a supercritical fluid to the molten ethylene copolymer having C≡C bond, wherein the azide or thiol compound is optionally dissolved in the compressed fluid.

According to the process of the invention, in step B), two or more types of azide or thiol compound may be reacted with the ethylene copolymer of step A). Said two or more of types of azide or thiol compound may be reacted with the ethylene copolymer of step A) successively or at the same time. Said two or more types of azide or thiol compound may consist of azide compounds, consist of thiol compounds or comprise both an azide compound and a thiol compound.

The invention further relates to a process for preparing different types of graft copolymer comprising polyethylene from one type of ethylene copolymer comprising side chains having C≡C bond. Accordingly, the invention provides a process for preparing a first graft copolymer comprising polyethylene and a second graft copolymer comprising polyethylene, wherein the first graft copolymer and the second graft copolymer are of different types, the process comprising the steps of:

A) providing an ethylene copolymer comprising side chains having C≡C bond,

B) reacting a first part of the ethylene copolymer of step A) with a first azide or thiol compound at an elevated temperature in the absence of a catalyst to obtain the first graft copolymer, wherein the first azide or thiol compound is an azide or thiol compound having a first functional group or a first polymer having an azide or a thiol group and C) reacting a second part of the ethylene copolymer of step A) with a second azide or thiol compound at an elevated temperature in the absence of a catalyst to obtain the second graft copolymer, wherein the second azide or thiol compound is an azide or thiol compound having a second functional group or a second polymer having an azide or a thiol group.

When the first or second azide or thiol compound is an azide or thiol compound having a functional group, the first or second graft copolymer is a functionalized grafted ethylene copolymer.

When the first or second azide or thiol compound is a polymer having an azide or a thiol group, the first or second graft copolymer is a graft copolymer of the ethylene copolymer of step A) and the polymer comprising the azide or the thiol group.

In some embodiments, step B) and step C) involve the use of azide compound. In some embodiments, step B) and step C) involve the use of thiol compound. In some embodiments, step B) involves the use of azide compound and step C) involves thiol compound. In some embodiments, step B) involves the use of thiol compound and step C) involves the use of azide compound.

Graft Copolymer

The invention further relates to the graft copolymer comprising polyethylene obtainable by the process of the invention.

The invention further relates to articles comprising the graft copolymer according to the invention. The articles may be a film, e.g. packaging of bakery items, snack foods, consumer durables, agricultural film, shrink film, medical packaging, upholstery wrap, a disposable glove or a film made by encapsulation; a molded article; an extruded article; an article made by 3D printing; an article made by compounding; a foam; a profile; an adhesive, a bitumen modifier; a sealant, a disposable diapers, a textile or a polymer alloy.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Examples

Step (A)

A low density ethylene copolymer comprising a triple bond was prepared in a 100 mL autoclave in batch operation.

In the first step, a solution of propargyl methacrylate (PMA) and n-heptane as a chain transfer agent was injected in the autoclave and further ethylene was charged in order to increase pressure up to about 1300 to 1500 bar. Subsequently a solution of tert-butyl peracetate (TBPA)/n-heptane was injected and the pressure was adjusted to 1900 bar.

The reaction conditions and the injected composition are summarized in Table 1.

Due to decomposition of the initiator the polymerization was started and a temperature rise was observed. After the reaction was finished, the pressure was released and the material was collected. The results are summarized in Table 2.

TABLE 1

| | T °C. | pressure bar | ethylene mol % | PMA mol % | n-heptane mol % | TBPA mol ppm |
|---|---|---|---|---|---|---|
| Ex 1 | 190 | 1900 | 98.4 | 0.4 | 1.6 | 18 |

TABLE 2

| | $M_n$ (kg/mol) | $M_w$ (kg/mol) | conversion (%) |
|---|---|---|---|
| Ex 1 | 12 | 84 | 3.5 |

$M_n$ and $M_w$ were determined by gel permeation chromatography (GPC). The GPC equipment was High-temperature GPC IR5 from Polymerchar with following details:

Detector: IR5 PolymerChar (filter: $CH_{total}$, $CH_2$, $CH_3$)
Autosampler: Agilent 1200
High-temperature (linear) columns:
3× Shodex UT 806M (30μ particle size, 10000 Å max. pore size) and
1× Shodex UT 807 (30μ particle size, 20000 Å max. pore size) connected in series Guard Column:
  Shodex UT-G (30μ particle size)
Sample Preparation for GPC:
  sample concentration: 1.5 mg/ml
  Mass of polymer sample: 10-20 mg (weighted in a 10 ml vial)+butylated
  hydroxytoluene (BHT) as stabilizer
  Solvent: 1,2,4-Trichlorobenzene (TCB)
  Solvent volume added by autosampler: 8 mL
  Solution temperature controlled by autosampler: 160° C.
  Solution time controlled by autosampler: 60 min
Measurement Conditions:
  Injection volume: 200 μL
  Flow rate: 1.0 mL/min
  Columns and detector temperature: 150° C.
  Eluent: 1,2,4-Trichlorobenzene (TCB)

The $CH_{total}$ signal from IR5 is used as concentration detector. A conventional calibration curve with polyethylene standards (compare following table) is used to convert the measured data to a molecular weight distribution.

Standards for Polyethylene: Molar mass at peak maximum
PE(Mp) [g/mol]

| |
|---|
| 338 |
| 507 |
| 1180 |
| 2030 |
| 22000 |
| 33500 |
| 55000 |
| 73000 |
| 99000 |
| 126000 |
| 168276 |

-continued

| |
|---|
| 558239 |
| 1050517 |

Software:
  Control software: PolymerChar GPC IR
  Data processing software: PSS WinGPC Unity 7.4.0 (conventional calibration)
  Wyatt ASTRA (light scattering)
Data Processing:
  dn/dc (at 658 nm): 0.104
  plotting formalism: Zimm (1$^{st}$ order)
  linear references: $<R_g^2>^{1/2}=0.0286*M^{0.575}$ [nm]
  $<\eta>=0.053*M^{0.703}$ [mL/g]
  Zimm-Stockmayer-model: trifunctional polydisperse Further, HT-$^1$H-NMR and HT-$^{13}$C-NMR were carried out on the obtained copolymer at 100° C. using $C_2D_2Cl_4$ as the solvent. Details of HT-$^1$H-NMR and HT-$^{13}$C-NMR are as follows:
  Bruker DRX 500 (500 MHz) spectrometer was used.

$^1$H-NMR (500.13 MHz), $^{13}$C-NMR (125.77 Mhz), 5 mm probe
  $^1$H-NMR: 30° pulse (11.1 μs), spectral width 10.33 kHz, relaxation delay (d1) 0.5 s, acquisition time 3.172 s, 64-80 Scans
  $^{13}$C-NMR: 30° pulse (7.4 μs), spectral width 37.0 kHz, relaxation delay (d1) 0.4 s, acquisition time 0.8848 s, 2000-20000 Scans, $^1$H-broad band decoupled
  used concentrations: 1.1 wt % ($^1$H, $C_2D_2Cl_4$, T=100° C.), 6.8 wt % ($^{13}$C, toluene, T=90° C.)

The results of HT-$^1$H-NMR are shown in FIG. 1. All signals of the incorporated monomer and triple bond function can be clearly allocated via HT-$^1$H-NMR and HT-$^{13}$C-NMR, confirming the presence of the triple bond in the copolymer. In addition, the signals of 3-$H_2$ and 1-$H_1$ show a ratio of 2:1, which is the same supposed from the molecular structure. This indicates that the triple bond itself does not or only rarely undergo side or consecutive reactions.

Hence, it can be confirmed that a copolymer of ethylene and PMA was obtained, comprising a triple bond.

Step (B)

A solution of the ethylene copolymer obtained in step A, solvent (see table) and $C_6H_5$—S—$CH_2$—$N_3$ was injected in a pressure cell for experiments at elevated pressure (Ex 2, 3) or in a round bottom flask with reflux condenser for experiments at atmospheric pressure (Ex 1). The mixture was heated up to temperature (see table) and stirred for a certain time (see table). In Ex 1, the reaction mixture was subsequently cooled and the polymer precipitated in acetone. Filtration and drying yielded the product. In Ex 2 and 3, the product was collected from the pressure cell after depressurizing, dissolved in hot $C_2H_2Cl_4$ and precipitated in acetone.

| Experiment | Solvent | T (° C.) | Time (hr) | Pressure (bar) | Conversion of thermal click reaction (%) | n(N$_3$)/n(≡) (mol/mol) |
|---|---|---|---|---|---|---|
| 1 | C2H2Cl4 | 130 | 4 | atmospheric | 38 | 1.7 |
| 2 | ethane | 105 | 24 | 2000 | 91 | 7.6 |
| 3 | ethylene | 105 | 24 | 1800 | 40 | 3.7 |

Figure 2:
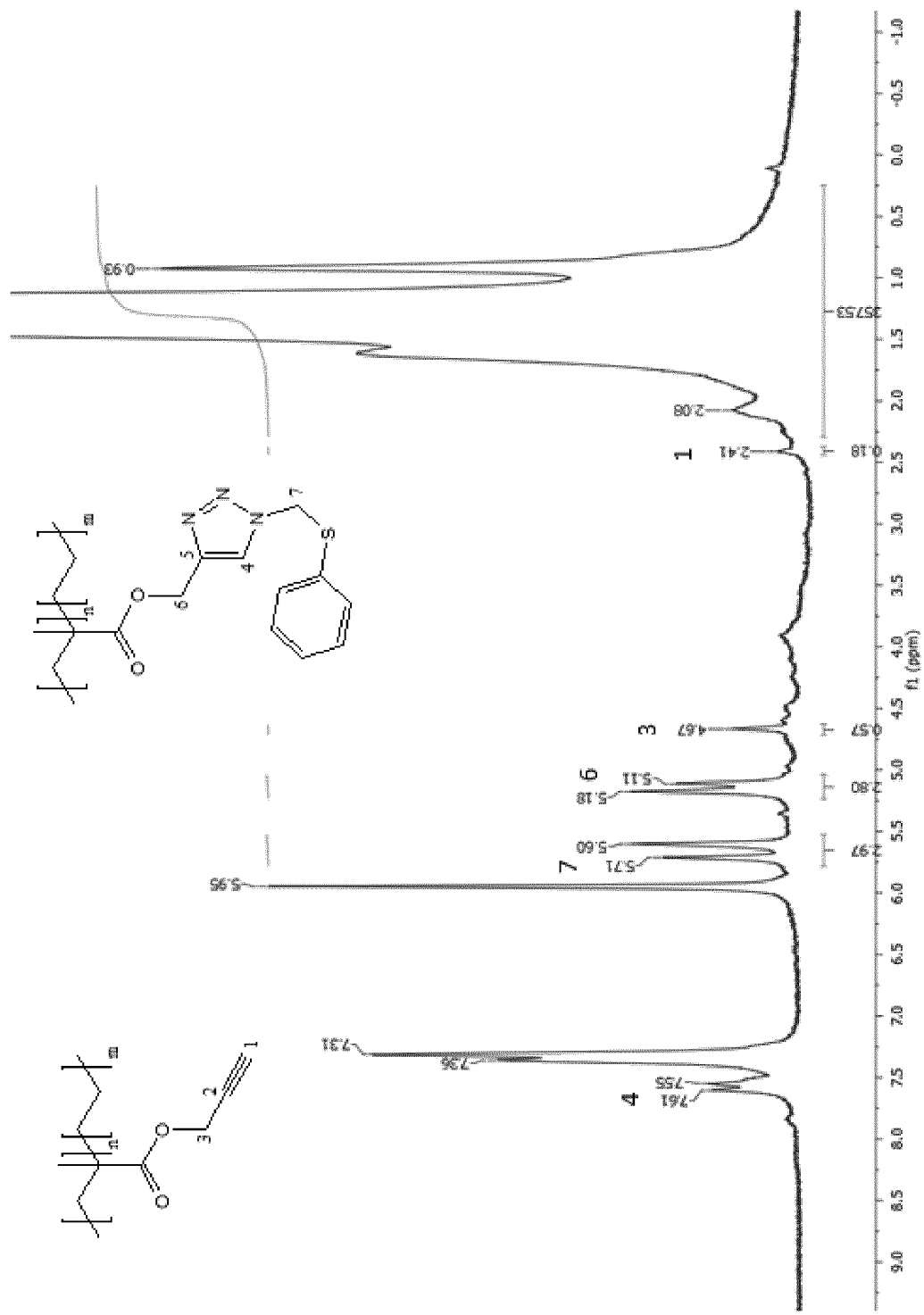
FIG. 2 shows the HT-$^1$H-NMR results of experiment 2.

It was confirmed by HT-$^1$H-NMR that reaction has been taking place with a conversion listed in table. The HT-$^1$H-NMR results of experiment 2 are shown in FIG. 2. For simplicity reasons, only one of the two different regioisomeric mixtures of 1,2,3-triazoles is shown (1,4-addition). All signals of the incorporated azide compound forming the two different regioisomeric mixtures of 1,2,3-triazoles can be clearly allocated via HT-$^1$H-NMR as one can see in FIG. 2. Additionally, the non-reacted triple bond in the copolymer is also visible. Based on integration of the signals, a conversion of the thermal click reaction could be calculated.

NMR Settings
HT-$^1$H-NMR was carried out on the obtained copolymer at 100° C. using $C_2D_2Cl_4$ as the solvent. Details of HT-$^1$H-NMR are as follows:
  Bruker Advance III HD 400 (400 MHz) spectrometer was used.
  $^1$H-NMR (400.13 MHz), 5 mm probe
  $^1$H-NMR: 90° pulse (29.4 μs), spectral width 8.013 kHz, relaxation delay (d1) 5 s, acquisition time 4.089 s, 16 Scans
  used concentrations: 3.6 wt % ($^1$H, $C_2D_2Cl_4$, T=100° C.)

The invention claimed is:
1. A process for preparing a graft copolymer comprising polyethylene, comprising the steps of:
   A) providing an ethylene copolymer comprising side chains having C≡C bond and
   B) reacting the ethylene copolymer of step A) with an azide at an elevated temperature in the absence of a catalyst to obtain the graft copolymer,
   wherein the azide is an azide compound having a functional group or a polymer having an azide group,
   wherein step B) is performed at a temperature between the melting point of the ethylene copolymer having C≡C bond and 300° C.
2. The process according to claim 1, wherein the ethylene copolymer of step A) is reacted with the azide compound in step B) and the azide compound is represented by

$$N_3\text{-spacer}^1\text{-FG}^1 \quad (I)$$

wherein
FG$^1$ is selected from the group consisting of —OH, —OR$^5$, —NH$_2$, —NHR, —NR$^5{}_2$, —SH, —CH=CH$_2$,

—COOH, —SO$_3$H, —NH—COR$^5$, —N$_3$, —Si(OR$^5$)$_3$,

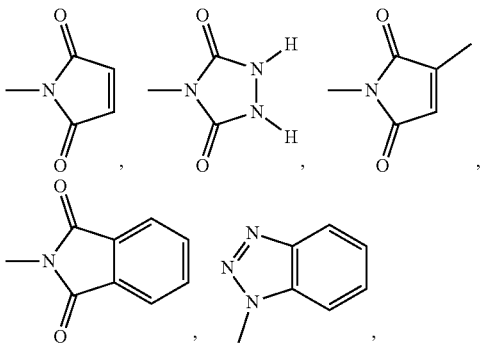

—I, —Br, —Cl, —F, —COOR$^5$, —COR$^5$, —CN, -phenyl, —C$_6$H$_4$R$^5$, —S—C$_6$H$_5$ and —CO—C$_6$H$_5$, where R$^5$ is a C$_1$-C$_{10}$ linear or branched alkyl,
spacer$^1$ is selected from the group consisting of —(CH$_2$)$_p$—, —(CH$_2$)$_p$—C$_6$H$_4$—, —C$_6$H$_4$—(CH$_2$)$_p$—, —(CHR$^6$)$_p$—, —(CR$^6{}_2$)$_p$—, —(O—CH$_2$—CH$_2$)$_p$—, —(O—CH$_2$—CHCH$_3$)$_p$—, —SO$_2$—, —SO$_2$—C$_6$H$_4$—, —SO$_2$—C$_6$H$_2$R$^6{}_2$—, —C$_6$H$_4$—, —C$_6$H$_2$R$^6{}_2$—,
where p is an integer from 1 to 20 and where R$^6$ is C$_1$-C$_{10}$ a linear or branched alkyl.

3. A process for preparing a graft copolymer comprising polyethylene, the process comprising the steps of:
   A) providing an ethylene copolymer comprising side chains having C≡C bond and
   B) reacting the ethylene copolymer of step A) with an azide at an elevated temperature in the absence of a catalyst to obtain the graft copolymer,
   wherein the azide is an azide compound having a functional group or a polymer having an azide group,
   wherein step A) involves preparing the ethylene copolymer in the presence of free-radical polymerization initiator at pressures in the range of from 150 MPa to 350 MPa and temperatures in the range of from 100° C. to 350° C. by copolymerizing ethylene and a comonomer having a C≡C bond and optionally further comonomers, wherein the comonomer having the C≡C bond is represented by formula

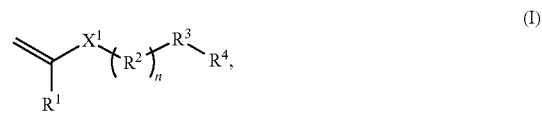

wherein
R$^1$ is hydrogen or methyl;
X$^1$ is —CO—O— or —CO—NH—;
R$^2$ is —CH$_2$—O—, —O—CO—, —Si(CH$_3$)$_2$—, —Si(CH$_3$)$_2$—O— or —CR$^5$R$^6$— wherein R$^5$ and R$^6$ are independently selected from hydrogen, methyl, ethyl and hydroxyl;
n is an integer from 1 to 32 and R$^2$ is same or different from each other when n is 2 to 32; and
R$^3$ is —C≡C— and R$^4$ is hydrogen, C$_1$-C$_{10}$ linear or branched alkyl, C$_1$-C$_{10}$ linear or branched hydroxyalkyl or phenyl
or
the unit R$^3$-R$^4$ stands for

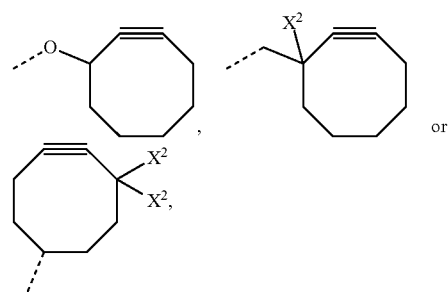

wherein X$^2$ is F, Cl, Br or I.

4. The process according to claim 3, wherein the comonomer having the C≡C bond is compound (I) or (III).

5. The process according to claim 3, wherein the comonomer having the C≡C bond is compound (I) wherein X$^1$ is —CO—O—, R$^2$ is —CH$_2$—, n is from 1 to 22, and R$^3$ is —C≡C— and R$^4$ is methyl or hydrogen or R$^3$-R$^4$ stands for

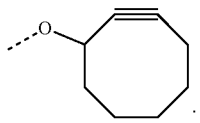

6. The process according to claim 3, wherein the comonomer having the C≡C bond is selected from the group consisting of propargyl acrylate, propargyl methacrylate, 2-methyl-acrylic acid 3-(cyclooct-2-ynyloxy)-propyl ester, 6-hepten-3-yn-1-ol, 3-methyl-1-penten-4-yn-3-ol, 2-methyl-6-hepten-3-yn-2-ol, 1-phenyl-4-penten-1-yne, 5-hexen-2-yn-1-ol, 3-(allyloxy)-1-propyne, allyl propiolate, 2-Nonynoic acid, 2-propen-1-yl ester, 2-methyl-1-hexen-3-yne and 2-methyl-1-buten-3-yne.

7. The process according to claim 3, wherein the comonomer having the C≡C bond is propargyl methacrylate or propargyl acrylate.

8. The process according to claim 3, wherein the amount of the comonomer having the C≡C bond is 0.1-10 mol % of the total weight of ethylene and all comonomers in step A).

9. The process according to claim 1, wherein step A) involves grafting a compound having a C≡C bond to a base ethylene polymer which is an ethylene homopolymer or a copolymer of ethylene and α-olefins with 3-12 C atoms.

10. The process according to claim 3, wherein step B) is performed at a temperature between the melting point of the ethylene copolymer having C≡C bond and 300° C.

11. The process according to claim 1, wherein the ethylene copolymer of step A) has a number average molecular weight $M_n$ of at least 5.0 kg/mol and/or a weight average molecular weight $M_w$ of at least 50 kg/mol.

12. The graft copolymer obtained by the process according to claim 1,
wherein the ethylene copolymer comprising side chains having C≡C bond of step A) is provided by copolymerizing ethylene and a comonomer having a C≡C bond and optionally further comonomers, wherein the comonomer having the C≡C bond is represented by formula

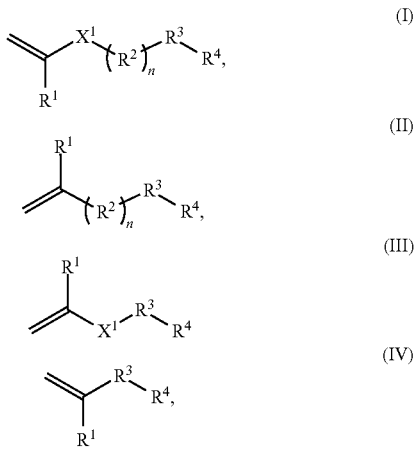

wherein
$R^1$ is hydrogen or methyl;
$X^1$ is —CO—O— or —CO—NH—;
$R^2$ is —CH$_2$—O—, —O—CO—, —Si(CH$_3$)$_2$—, —Si(CH$_3$)$_2$—O— or —CR$^5$R$^6$— wherein $R^5$ and $R^6$ are independently selected from hydrogen, methyl, ethyl and hydroxyl;

n is an integer from 1 to 32 and $R^2$ is same or different from each other when n is 2 to 32; and
$R^3$ is —C≡C— and $R^4$ is hydrogen, $C_1$-$C_{10}$ linear or branched alkyl, $C_1$-$C_{10}$ linear or branched hydroxyalkyl or phenyl
or
the unit $R^3$-$R^4$ stands for

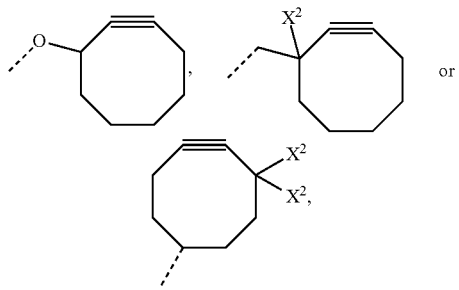

wherein $X^2$ is F, Cl, Br or I.

13. An article comprising the graft copolymer according to claim 12.

14. The article according to claim 13, wherein the article is a film; a molded article; an extruded article; an article made by 3D printing; an article made by compounding; a foam; a profile; an adhesive; a bitumen modifier; a sealant; a disposable diaper; a textile; or a polymer alloy.

15. The article according to claim 14, wherein the film is packaging of bakery items, snack foods, consumer durables, an agricultural film, a shrink film, medical packaging, upholstery wrap, a disposable glove or a film made by encapsulation.

16. The graft copolymer according to claim 12, wherein the comonomer having the C≡C bond is compound (I) or (III).

17. The graft copolymer according to claim 12, wherein the comonomer having the C≡C bond is compound (I) wherein $X^1$ is —CO—O—, $R^2$ is —CH$_2$—, n is from 1 to 22, and $R^3$ is —C≡C— and $R^4$ is methyl or hydrogen or $R^3$-$R^4$ stands for

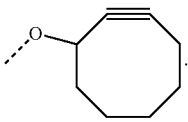

18. The graft copolymer according to claim 12, wherein the comonomer having the C≡C bond is selected from the group consisting of propargyl acrylate, propargyl methacrylate, 2-methyl-acrylic acid 3-(cyclooct-2-ynyloxy)-propyl ester, 6-hepten-3-yn-1-ol, 3-methyl-1-penten-4-yn-3-ol, 2-methyl-6-hepten-3-yn-2-ol, 1-phenyl-4-penten-1-yne, 5-hexen-2-yn-1-ol, 3-(allyloxy)-1-propyne, allyl propiolate, 2-Nonynoic acid, 2-propen-1-yl ester, 2-methyl-1-hexen-3-yne and 2-methyl-1-buten-3-yne.

19. The graft copolymer according to claim 12, wherein the comonomer having the C≡C bond is propargyl methacrylate or propargyl acrylate.

20. The graft copolymer according to claim 12, wherein the amount of the comonomer having the C≡C bond is 0.1-10 mol % of the total weight of ethylene and all comonomers in step A).

* * * * *